(No Model.)
T. DAVIES.
Root Cutter.
No. 235,416.  Patented Dec. 14, 1880.
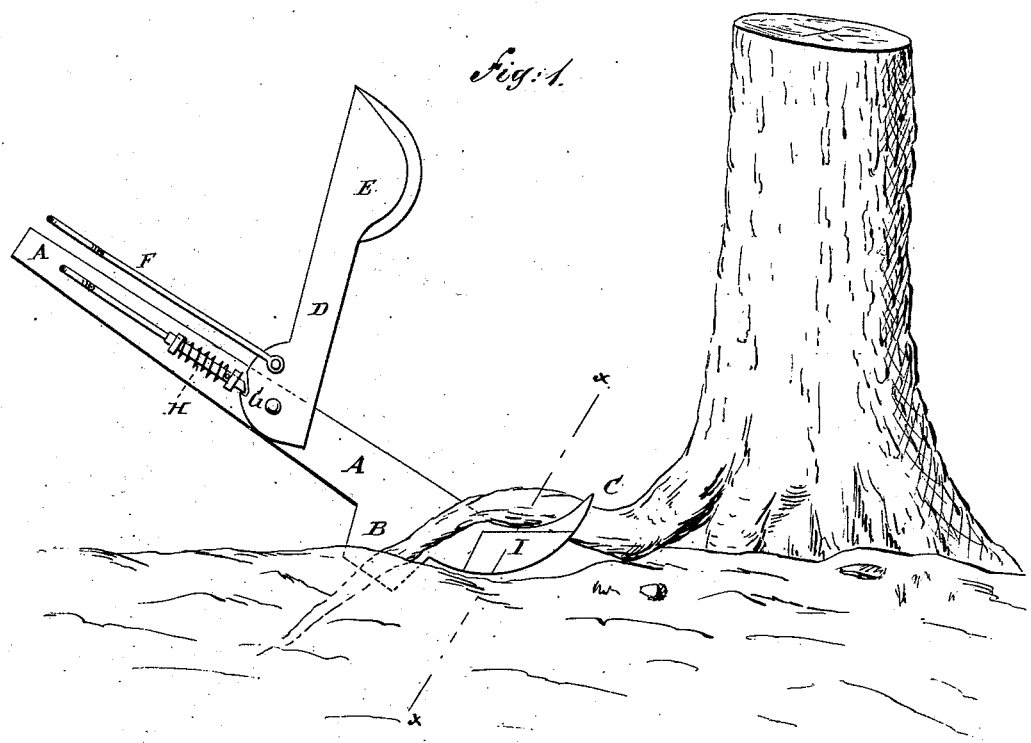
Fig. 1.
Fig. 2.
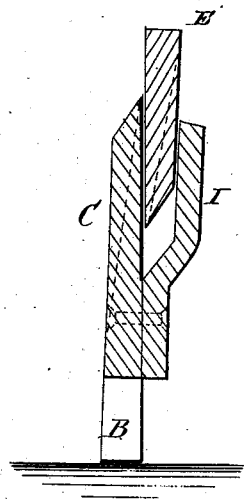
WITNESSES:
Chas. Niola
C. Sedgwick
INVENTOR:
T. Davies
BY Munn & Co
ATTORNEYS.

UNITED STATES PATENT OFFICE.

THOMAS DAVIES, OF FALL RIVER, MASSACHUSETTS.

ROOT-CUTTER.

SPECIFICATION forming part of Letters Patent No. 235,416, dated December 14, 1880.

Application filed October 8, 1880. (No model.)

*To all whom it may concern:*

Be it known that I, THOMAS DAVIES, of Fall River, in the county of Bristol and State of Massachusetts, have invented a new and useful Improvement in Root-Cutters, of which the following is a specification.

Figure 1 is a side elevation of the improvement. Fig. 2 is a cross-section of the same, taken through the line $x\ x$, Fig. 1.

Similar letters of reference indicate corresponding parts.

The object of this invention is to furnish cutters for cutting the roots of trees which shall be so constructed that the said roots can be conveniently cut in felling the trees without dulling the cutters, and which can be used for cutting the limbs from fallen trees, for splitting wood, and for various other purposes.

A represents a lever, upon the lower side of which, near its forward end, is formed a projection, B, to serve as a fulcrum. The projection B should be made wide to keep it from sinking into the ground when subjected to a strong pressure. The forward end, C, of the lever A is drawn to a point, is curved upward, and has an edge formed upon its upper or concave side.

To the lever A, a little above the fulcrum B, is pivoted the end of a bar, shank, or handle, D, upon the free end of which is formed a head, E, the lower side of which is convexed to correspond with the concavity of the point C.

To the handle D, at a little distance from its pivot, is pivoted or otherwise attached the end of a rod or handle, F, for convenience in raising the cutter-head E.

Upon the end of the handle D is formed a notch or catch, G, to engage with a catch, H, attached to the lever A, to hold the cutter-head E in place when raised.

Upon the side of the hook or point C along which the head E works is formed, or to it is attached, a guard-plate, I, to form a socket to receive the head E, to prevent its edge from coming in contact with the ground, rocks, or stones when making a cut, and thus prevent the said edge from being dulled.

The cutting-edges of the hook or bent point C and head E may be made in the form of chisel or shear edges, as shown in full lines in Fig. 2, or in the form of ax or knife edges, as shown in dotted lines in Fig. 2.

In using the implement for cutting roots the cutting-head E is raised and fastened out of the way by the catches G H, and the hook C is passed beneath the root to be cut. The lever A is then pressed downward to bend the root upward and put its fibers under tension. The catches G H are then disengaged to allow the cutter-head E to drop upon the root and cut it. In this way the roots all around the tree are cut. In cutting the last root a strong pressure is applied to the lever A to cause the tree to incline toward the other side, so that it will fall in that direction when the said last root is cut.

Having thus fully described my invention, I claim as new and desire to secure by Letters Patent—

1. A root-cutter constructed substantially as herein shown and described, consisting of the lever A, having fulcrum-projection B and hook C, the pivoted handle D, having cutting-head E, the handle F, the catches G H, and the guard-plate I, as set forth.

2. In a root-cutter, the combination, with the lever A, having fulcrum-projection B and hook C, of the pivoted handle D, having cutting-head E, the handle F, and the catches G H, substantially as herein shown and described, whereby the roots can be raised and cut, as set forth.

THOMAS DAVIES.

Witnesses:
EDWARD GIBSON,
JAMES DOUGHERTY.